(12) United States Patent
Wirola et al.

(10) Patent No.: US 8,169,364 B2
(45) Date of Patent: May 1, 2012

(54) DETERMINATION OF A RELATIVE POSITION OF A SATELLITE SIGNAL RECEIVER

(75) Inventors: Lauri Wirola, Tampere (FI); Jari Syrjärinne, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/955,246

(22) Filed: Nov. 29, 2010

(65) Prior Publication Data

US 2011/0074625 A1    Mar. 31, 2011

Related U.S. Application Data

(62) Division of application No. 11/743,070, filed on May 1, 2007, now Pat. No. 7,869,811.

(51) Int. Cl.
*G01S 19/51* (2010.01)
(52) U.S. Cl. .................................. 342/357.34
(58) Field of Classification Search .............. 342/357.34
See application file for complete search history.

(56) References Cited

U.S. PATENT DOCUMENTS

| 5,148,179 | A | 9/1992 | Allison |
| 5,740,048 | A | 4/1998 | Abel et al. |
| 2005/0004748 | A1* | 1/2005 | Pinto et al. ............... 701/200 |
| 2005/0186966 | A1 | 8/2005 | Belcea |
| 2007/0037588 | A1 | 2/2007 | Mohi et al. |
| 2007/0236388 | A1* | 10/2007 | Fiedelak et al. ......... 342/357.08 |

FOREIGN PATENT DOCUMENTS

WO    2006043123    4/2006

* cited by examiner

*Primary Examiner* — Harry Liu

(57) ABSTRACT

For enhancing the quality of a relative positioning, a filter is adjusted depending on information on a movement of a satellite signal receiver. A position of the satellite signal receiver is determined relative to a reference station using the filter, wherein measurements on satellite signals received by the satellite signal receiver and measurements on satellite signals provided for the reference station are used as input to the filter. The measurements for the reference station may be received in messages which are assembled and provided for transmission and which may include in addition an indication of a current movement of the reference station.

20 Claims, 6 Drawing Sheets

DETERMINATION OF A RELATIVE POSITION OF A SATELLITE SIGNAL RECEIVER

CROSS REFERENCE TO RELATED APPLICATION

This application is a divisional of application Ser. No. 11/743,070 filed on May 1, 2007 now U.S. Pat. No. 7,869,811 and claims domestic priority under 35 U.S.C. §120.

FIELD OF THE INVENTION

The invention relates to supporting the determination of a relative position of a satellite signal receiver.

BACKGROUND OF THE INVENTION

An absolute positioning of a device is supported by various Global Navigation Satellite Systems (GNSS). These include for example the American Global Positioning System (GPS), the Russian Global Navigation Satellite System (GLONASS), the future European system Galileo, the Space Based Augmentation Systems (SBAS), the Japanese GPS augmentation Quasi-Zenith Satellite System (QZSS), the Locals Area Augmentation Systems (LAAS), and hybrid systems. The satellites of these systems are also referred to as space vehicles (SV).

The constellation in GPS, for example, consists of more than 20 satellites that orbit the earth. Each of the satellites transmits two carrier signals L1 and L2. One of these carrier signals L1 is employed for carrying a navigation message and code signals of a standard positioning service (SPS). The L1 carrier phase is modulated by each satellite with a different C/A (Coarse Acquisition) code. Thus, different channels are obtained for the transmission by the different satellites. The C/A code is a pseudo random noise (PRN) code, which is spreading the spectrum over a 1 MHz bandwidth. It is repeated every 1023 bits, the epoch of the code being 1 ms. The carrier frequency of the L1 signal is further modulated with navigation information at a bit rate of 50 bit/s. The navigation information comprises inter alia ephemeris and almanac parameters. Ephemeris parameters describe short sections of the orbit of the respective satellite. Based on these ephemeris parameters, an algorithm can estimate the position of the satellite for any time while the satellite is in the respective described section. The almanac parameters are similar, but coarser orbit parameters, which are valid for a longer time than the ephemeris parameters. The navigation information further comprises for example clock models that relate the satellite time to the system time of GPS and the system time to the Coordinated Universal Time (UTC).

A GPS receiver of which the position is to be determined receives the signals transmitted by the currently available satellites, and it detects and tracks the channels used by different satellites based on the different comprised C/A codes. Then, the receiver determines the time of transmission of the code transmitted by each satellite, usually based on data in the decoded navigation messages and on counts of epochs and chips of the C/A codes. The time of transmission and the measured time of arrival of a signal at the receiver allow determining the pseudorange between the satellite and the receiver. The term pseudorange denotes the geometric distance between the satellite and the receiver, which distance is biased by unknown satellite and receiver offsets from the GPS system time.

In one possible solution scheme, the offset between the satellite and system clocks is assumed known and the problem reduces to solving a non-linear set of equations of four unknowns (3 receiver position coordinates and the offset between the receiver and GPS system clocks). Therefore, at least 4 measurements are required in order to be able to solve the set of equations. The outcome of the process is the receiver position.

Similarly, it is the general idea of GNSS positioning to receive satellite signals at a receiver which is to be positioned, to measure the pseudorange between the receiver and the respective satellite and further the current position of the receiver, making use in addition of estimated positions of the satellites. Usually, a PRN signal which has been used for modulating a carrier signal is evaluated for positioning, as described above for GPS.

In a further approach, the carrier phases and/or the code phases measured at two GNSS receivers are evaluated for determining the distance and attitude between the two receivers very accurately, typically at cm- or even mm-level accuracy. The combination of the distance and attitude between two receivers, and thus the vector between these receivers, is also referred to as baseline. The carrier phase measurements that are performed at GNSS receivers may be exchanged in real-time or in near real-time, or be stored for a later exchange known as post-processing. Usually, one of the GNSS receivers is arranged at a known location and called reference station, while the other receiver is to be positioned with respect to the reference station and called user receiver or rover. The determined relative position can further be converted into an absolute position, if the location of the reference position is accurately known. However, the relative positioning calculations actually require that the positions of both receivers are known at least approximately. These positions can be obtained from determined pseudoranges. Alternatively, it would also be sufficient to know only a reference location approximately, since the rover location can be obtained therefrom by adding the baseline estimate to the reference location.

A satellite signal is distorted on its way from a satellite to a receiver due to, for instance, multipath propagation and due to influences by ionosphere and troposphere. Moreover, the satellite signal has a bias due to the satellite clock bias. All errors that are common to a signal in both receivers can be assumed to correlate between the receivers and satellites, and thus to vanish in double differencing.

The relative positioning may thus be based more specifically on signal measurements at two GNSS receivers, which are used to form double difference observables. Such signal measurements may include for example carrier phase measurements and PRN code measurements, etc. A double difference observable relating to the carrier phase is the difference in the carrier phase of a specific satellite signal at both receivers compared to the difference in the carrier phase of another satellite signal at both receivers. A double difference observable relating to the PRN code may be obtained correspondingly. The double difference observables can then be employed for determining the position of the receivers relative to each other at high accuracy.

With conventional GNSS positioning, two GNSS receivers are able to determine their location, and therefore the baseline between them, with an accuracy of 5 to 20 meters. The carrier or code phase based approach, in contrast, allows determining the baseline with a much higher accuracy of 0.1 to 10 cm. It is noteworthy that this accuracy can be achieved with standard commercial GNSS-receivers.

When using the carrier or code phase based approach, however, it has to be considered that a carrier or code phase measured at two receivers is based on a different number of whole cycles of the carrier. This effect is referred to as double-difference integer ambiguity or double-difference float ambiguity, which has to be solved. This process is also called integer ambiguity resolution or initialization.

The double-difference integer ambiguity may be resolved by gathering carrier and/or code phase data from a sufficient number of satellites at sufficient measurement instants.

Once the baseline has been determined and the integer ambiguity resolved, the integer ambiguity solution may be validated in order to determine whether it can be relied on. Integer ambiguity validation is typically done using statistical tools.

The solved and validated integer ambiguities may then be used for tracking the baseline between the receivers at high precision, for instance with a sub-cm accuracy.

The carrier phase measurement performed by a GNSS receiver on a GNSS signal originating from a GNSS SV is also called 'accumulated delta range (ADR) measurement' or 'integrated Doppler measurement'.

Originally, carrier phase based positioning was only available for geodesic surveying and other applications requiring a high accuracy. The equipment required for such applications is expensive and meant, therefore, only for professional use. In these cases, the baseline is moreover often determined off-line. However, it is also possible to obtain a high-precision baseline using two low-cost GNSS-enabled handsets, for example terminals with integrated GNSS-receiver or terminals equipped with an external Bluetooth GNSS-receiver. The data between the terminals can be exchanged using any kind of data transfer technology, like general packet radio service (GPRS), wireless local area networks (WLAN) or Bluetooth®. This allows the baseline to be determined and updated in real-time or near real-time. This approach is also called mobile Real-Time Kinematics (mRTK), indicating that mobile technology is used to expand the carrier-phase based use cases and bring the benefits of the technology to a wider audience. Instead of a second handset, the reference station could also be for instance a location measurement unit (LMU) of a network or a virtual reference station (VRS) for which the required measurement data is provided.

SUMMARY

The invention proceeds from the consideration that a relative positioning can be implemented for instance using a filter, like an extended Kalman filter. Such a filter is suited for example for solving double difference integer ambiguities and equally for tracking a baseline once the integer ambiguities have been solved. The quality of the relative positioning may depend largely on the selected properties of the filter. Properties of a filter may include for example a selected state space and a selected process noise. The process noise is provided to allow for non-modeled dynamics in the system. A state space may contain for example only a baseline vector, a baseline rate-of-change vector and a float ambiguities vector, but no baseline acceleration vector. However, the baseline may have acceleration. The process noise allows taking account of these dynamics.

A first method is described, which comprises adjusting a filter depending on information on a movement of a satellite signal receiver. The method further comprises determining a position of the satellite signal receiver relative to a reference station using the filter. Measurements on satellite signals received by the satellite signal receiver and measurements on satellite signals provided for the reference station are used as input to the filter.

Moreover, a first apparatus is described, which comprises a filter adjustment component configured to adjust a filter depending on information on a movement of a satellite signal receiver. The apparatus further comprises a positioning component configured to determine a position of the satellite signal receiver relative to a reference station using the filter, wherein measurements on satellite signals received by the satellite signal receiver and measurements on satellite signals provided for the reference station are used as input to the filter.

The components of the apparatus can be implemented in hardware and/or software. They may be implemented for instance in the form of a processor executing software program code for realizing the required functions. Alternatively, they could belong for instance to a circuit that is designed to realize the required functions, for instance in a chipset or a chip, like an integrated circuit. The described first apparatus may optionally comprise additional components. The apparatus could further be for example a module provided for integration into a device, like a mobile terminal or a GNSS receiver device.

Moreover, a first device is described, which comprises the described first apparatus and in addition a wireless communication component configured to receive from another device measurements on satellite signals for the reference station. Such a device could be for instance a mobile terminal, like a mobile phone or a laptop, or a GNSS receiver device. Other exemplary components that could be included in the device are a satellite signal receiver, a user interface and/or a sensor. An included sensor could be used for providing the information on the movement of the satellite signal receiver, even though such information may also be available from another source. If a sensor is employed, the sensor could also be arranged outside of the first device; it only has to be ensured that the sensor is subjected to the same motion as the satellite signal receiver.

The first device could also belong to an arrangement, which comprises in addition a further device, for example an accessory device including the satellite signal receiver.

Moreover, a first computer program product is described, in which a program code is stored in a computer readable medium. The program code realizes the described first method when executed by a processor. The computer program product could be for example a separate memory device, or a memory that is to be integrated in a device. The invention is to be understood to cover such a computer program code also independently from a computer program product and a computer readable medium.

Moreover, a second method is described, which comprises assembling messages including measurements on satellite signals that are valid for a reference station and including an indication of a current movement of the reference station. The method further comprises providing the assembled messages for transmission to a device.

The indication of a movement enables the receiving device to adjust a filter based on a determined change of a position of a satellite signal receiver relative to the reference station, and the measurements enable the receiving device to determine a relative position of the satellite signal receiver to the reference station using the filter.

Moreover, a second apparatus is described, which comprises at least one processing component configured to assemble messages including measurements on satellite signals that are valid for a reference station and including an indication of a current movement of the reference station. The processing component is further configured to provide the assembled messages for transmission to a device.

The at least one processing component of the second apparatus can equally be implemented in hardware and/or software. It may be for instance a processor executing software program code for realizing the required functions. Alternatively, it could be for instance a circuit that is designed to realize the required functions, for instance implemented in a chipset or a chip, like an integrated circuit. The described apparatus can be for example identical to a comprised processing component, but it may also comprise additional components. The apparatus could further be for example a module provided for integration into a device, like a mobile terminal or a network element.

Moreover, a second device is described, which comprises the described second apparatus and in addition an interface configured to enable a direct or indirect communication with another device. The second device itself could be for instance a mobile terminal or a network element, like a network server. The second device could comprise in addition for instance a satellite signal receiver functioning as the reference station. The second device could also belong to an arrangement, which comprises in addition a further device including a satellite signal receiver.

Moreover, a second computer program product is described, in which program code is stored in a computer readable medium. The program code realizes the described second method when executed by a processor. The computer program product could be again for example a separate memory device, or a memory that is to be integrated in an electronic device. The invention is to be understood to cover such a computer program code also independently from a computer program product and a computer readable medium.

Finally, a system is described, which comprises the described first apparatus and the described second apparatus.

By using an adjustable filter for a relative positioning of a satellite signal receiver, the quality of the positioning can be improved, since the optimal filter properties may depend on the presence or absence of a motion of the satellite signal receiver and on the kind of a current motion.

Different properties of a filter are suited for being optimized depending on the movement of the satellite signal receiver.

For example, the state space of the filter could be selected depending on the movement of the satellite signal receiver. The filter could then be adjusted to have a state space including rate-of-change components only in case the information on a movement of the satellite signal receiver indicates a change of the position of the satellite signal receiver relative to the reference station. Omitting a rate-of-change component in the first place when not required has the advantage of a faster convergence of the filter solution.

Alternatively or in addition, the filter could be adjusted to have a state space including acceleration components only in case the information on a movement of the satellite signal receiver indicates acceleration in the position of the satellite signal receiver relative to the reference station. The acceleration components represent the rate-of-change of the rate-of-change. It has to be noted that acceleration components could also be added only for selected situations, that is, in case some additional criterion is met.

Alternatively or in addition, an assumed process noise of the filter could be adjusted.

In one embodiment, the filter is adjusted by using a lower process noise in case the information on a movement of the satellite signal receiver indicates no change of the position of the satellite signal receiver relative to the reference station and a higher process noise in case the information on a movement of the satellite signal receiver indicates a change of the position of the satellite signal receiver relative to the reference station.

In another embodiment, the filter is adjusted by using a process noise having a magnitude which depends on a change of motion of the satellite signal receiver relative to the reference station. The considered change of motion could be a detected amount of acceleration, but it could also be a motion that is simply detected not to be constant/steady. The filter could be adjusted for example by using a process noise which increases with an increasing change of motion of the satellite signal receiver relative to the reference station.

If the process noise is assumed to be constant, the filter may in the worst case diverge, which prevents an initialization of ambiguities and results in losing valuable time. With an adaptive process noise, in contrast, the perturbation of the accuracy of the relative positioning solution can be reduced and the filter may also be stabilized instantly after acceleration in the relative position.

A sensor providing the information on a movement of the satellite signal receiver can be for example an inertial sensor, like an accelerometer.

The adjustment of the filter may depend only on the indicated movement of the satellite signal receiver, in case the reference station can be assumed to be at a fixed position. Information that the reference receiver is fixed may be available or be provided.

In this case, adjusting the filter depending on information on a movement of a satellite signal receiver comprises adjusting the filter depending on a change of a position of the satellite signal receiver relative to the fixed reference station.

Alternatively, the receiver station may be mobile. In this case, adjusting the filter depending on information on a movement of a satellite signal receiver may comprise adjusting the filter depending on a change of a position of the satellite signal receiver relative to the reference station, wherein information on a movement of the reference station is provided.

The information may be provided by a device that comprises the reference station or by a device that is linked to the reference station. The device may determine the information from sensor information on the movement of the reference station. The provided information may include only an indication of a detected movement as such or information on an acceleration of the reference station.

The filter can be for example a Kalman filter, but equally any other filter that is suited to be used in relative positioning computations. The formulation and the actual implementation of Kalman filters for example, including extended Kalman filters and other types of Kalman filters, are well-known in the art.

The measurements may be used by the filter for forming double difference observables, but single difference observables or wide-lane observables could be used as well for example.

The measurements may comprise carrier-phase measurements on satellite signals and/or other measurements, like code phase measurements. Carrier-phase measurements enable the device to perform a high-accuracy positioning of the satellite signal receiver.

If the measurements are provided for a reference station of which the location is accurately known, the receiving device may also be enabled to perform positioning calculations resulting in an absolute position of high accuracy.

The invention can be employed for example in high-precision navigation and surveying applications. It can be provided for professional use, but also for fun applications, such as writing with a GNSS receiver.

The invention can be used with any kind of satellite signals, in particular, though not exclusively, with satellite signals transmitted in a GNSS, like GPS, GLONASS, GALILEO, SBAS, QZSS, LAAS or a combination of these. LAAS makes use of pseudolites instead of true satellites, but these pseudolites are to be understood to be covered as well by the term satellite as used in this application. LAAS has the advantage that it enables the use of a carrier- or code-phase based positioning under indoor conditions as well.

It is to be understood that all presented exemplary embodiments may be used in any suitable combination.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
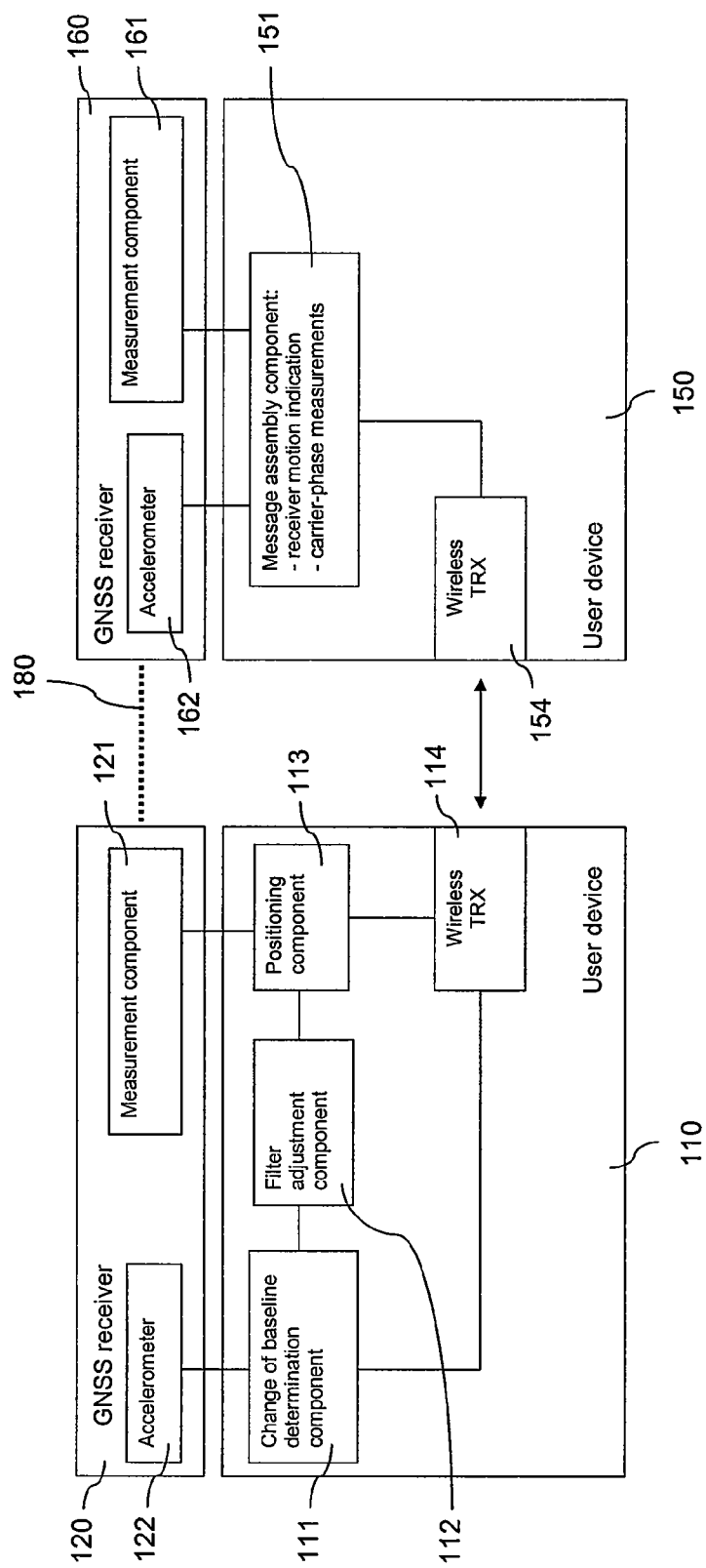
FIG. 1 is a schematic block diagram of a system according to a first embodiment of the invention.

FIG. 1 is a schematic block diagram of a system, which enables an adaptive filtering for determining and tracking a baseline between two GNSS receivers in accordance with a first embodiment of the invention.

The system comprises two user devices 110, 150, for example mobile phones or laptops.

Each of the user devices 110, 150 is connected to a GNSS receiver 120, 160. The GNSS receivers 120, 160 are accessory devices that can be linked to a respective user device 110, 150 using any suitable link, like a physical connection or a Bluetooth® link, etc. Thus, the GNSS receivers 120, 160 could be moved by a user separately from the user devices 110, 150. Alternatively, the GNSS receivers 120, 160 could be integrated in the user devices 110, 150.

Each of the GNSS receivers 120, 160 comprises a measurement component 121, 161, which is able to perform carrier phase measurements on received satellite signals of at least one GNSS, for instance Galileo or GPS. Each of the GNSS receivers 120, 160 further comprises an accelerometer 122, 162, which is able to measure the acceleration of the GNSS receiver 120, 160. GNSS receiver 120 will also be referred to as rover receiver, while GNSS receiver 160 will also be referred to as reference receiver.

User device 110 comprises a change of baseline determination component 111, a filter adjustment component 112, a positioning component 113 and a wireless transceiver 114. The change of baseline determination component 111 is linked to the transceiver 114, to the filter adjustment component 112 and to the accelerometer 122 of GNSS receiver 120. The positioning component 113 is linked to the transceiver 114, to the filter adjustment component 112 and to the measurement component 121 of GNSS receiver 120.

The transceiver 114 enables a communication with another device via a wireless link, like a Bluetooth® connection, a UWB connection or an infrared connection.

The positioning component 113 is configured to determine a baseline between an antenna reference point of GNSS receiver 120 and an antenna reference point of GNSS receiver 160 based on carrier-phase measurements at both receivers.

As mentioned above, carrier-phase based positioning computations are usually based on solving double-difference integer or float ambiguities. The problem formulation may lead to an exemplary measurement equation given by:

$$\phi_{km}^{pq} = \rho_{km}^{pq} + \lambda N_{km}^{pq} + T_{km}^{pq} - \left(\frac{\lambda}{\lambda_{ref}}\right)^2 I_{km}^{pq} + \varepsilon_{km}^{pq}, \quad (1)$$

where $\phi_{km}^{pq}$ is the double difference observable defined by $\phi_{km}^{pq} = (\phi_k^p - \phi_m^p) - (\phi_k^q - \phi_m^q)$, where $\phi_k^p, \phi_m^p, \phi_k^q, \phi_m^q$, are the carrier phase measurements by the receivers k (GNSS receiver 160) and m (GNSS receiver 120) of the signals originating from the satellites p and q. Moreover, $\rho_{km}^{pq}$ is the double difference of geometric ranges defined by $$\rho_{km}^{pq} = (\rho_k^p - \rho_m^p) - (\rho_k^q - \rho_m^q)$$
$$= (\|\underline{x}^p - \underline{x}_k\| - \|\underline{x}^p - (\underline{x}_k + \underline{b})\|) - (\|\underline{x}^q - \underline{x}_k\| - \|\underline{x}^q - (\underline{x}_k + \underline{b})\|),$$

where $x^p$ and $x^q$ are the positions of the satellites p and q, respectively. $\overline{x_k}$ is the position of the reference receiver k and b is the unknown baseline 180 to be determined. Finally, $\lambda$, $\overline{\lambda}_{ref}$, $N_{km}^{pq}$, $T_{km}^{pq}$, $I_{km}^{pq}$ and $\varepsilon_{km}^{pq}$ are the wavelength, reference wavelength (typically $\lambda_{L1}$), unknown double difference ambiguity (note that $N_{km}^{pq} \in \aleph^{nsat}$), troposphere delay, ionosphere advance and double-difference measurement noise, respectively.

Solving equation (1) yields the fixed baseline estimate $\check{b}$ and double-difference float ambiguities $\check{N}$. Once the double-difference float ambiguities are solved, the baseline estimate can be tracked easily.

It has to be noted that a time variable has been omitted from the equations for the sake of clarity. However, accounting for different measurement instants and time-of-flight differences between the receivers is required for solving the equations. It has further to be noted that $T_{km}^{pq}$ and $I_{km}^{pq}$ may be neglected in short baseline applications. In general, it has to be noted that the presented equations may be modified and extended in various ways.

In processing component 113, solving equation (1) is implemented by way of example using an extended Kalman filter, which can be summarized by the following equations:

$$\begin{cases} \underline{z}_k = \underline{h}(\underline{x}_k) + \underline{q}_k \\ \underline{x}_{k+1} = \underline{f}(\underline{x}_k), \end{cases} \quad (2)$$

where $z_k$ is the vector of measurements at instant k, $x_k$ the state at instant k, $q_k$ the process noise at instant k and $x_{k+1}$ the state at instant (k+1). The vector functions h and f are non-linear mappings. The state space $\underline{x}_k$ comprises the baseline and conditionally on the double difference float ambiguities and baseline rate of change, as will be explained further below. As mentioned above, the process noise is included for taking into account, for instance, possible acceleration of the baseline, which is not modeled in the defined state space. The expression 'acceleration of a baseline' is used to denote the acceleration of one end of the baseline relative to the other end of the baseline.

The components of user device 110 may be implemented in hardware, for example in an integrated circuit chip. It is to be understood, though, the functions of some or all of the depicted components could also be implemented in program code modules that are executed by a processor.

Further, it is to be understood that the functions realized by the components 111, 112 and 113 could also be implemented in the GNSS receiver 120 instead or be distributed to components of user device 110 in many different ways.

User device 150 comprises equally a wireless transceiver 154. The transceiver 154 enables a direct or indirect communication with user device 110.

The transceiver 154 is linked within user device 150 to a message assembly component 151. The message assembly component 151 is moreover linked to the GNSS signal measurement component 161 and to the accelerometer 162 of GNSS receiver 160.

The components of user device 150 may be implemented in hardware, for example in an integrated circuit chip. It is to be understood, however, that some or all of the functions of component 151 could also be implemented in program code modules executed by a processor of the user device 150.

It is further to be understood that component 151 of user device 150 could also belong to the GNSS receiver 160 instead or that the associated functions could be distributed to components of user device 150 in many different ways.

The distance and attitude between GNSS receiver 120 and GNSS receiver 160, and more specifically between their respective GNSS antenna reference points, are represented in FIG. 1 by a thick, dotted baseline 180.

The GNSS receivers 120, 160 are both configured to operate as normal GNSS receivers. That is, they are configured to receive, acquire, track and decode signals transmitted by satellites belonging to one or more GNSSs, like GPS and Galileo. Further, the GNSS receivers 120, 160 are configured to compute a stand-alone position in a known manner based on the received satellite signals. Corresponding components are not depicted separately. It is to be understood that the required computations could also be realized outside of the GNSS receivers 120, 160. For a particular application, however, the position of GNSS receiver 120 might have to be determined with high-precision relative to the position of GNSS receiver 160. To this end, an enhanced relative positioning approach is employed, as illustrated in the flow chart of FIG. 2.

The positioning component 113 of user device 110 initiates the high-precision positioning—for instance upon a corresponding user input via a user interface—by sending a relative positioning assistance request via transceiver 114 to user device 150. In addition, it requests carrier-phase measurements on satellite signals and acceleration information from GNSS receiver 120.

In user device 150, the assistance request is received by transceiver 154 and provided to the message assembly component 151. The message assembly component 151 requests carrier-phase measurements on satellite signals and acceleration information from GNSS receiver 160.

The message assembly component 151 receives the requested carrier phase measurements on satellite signals from measurement component 161, for instance in the form of ADR measurements, and the requested acceleration information from accelerometer 162.

The velocity information which could be obtained by a conventional GNSS positioning always includes some noise. Therefore, the velocity information for GNSS reference receiver 160 preferably comes from an alternative source, like accelerometer 162. In another embodiment, it could also be known that the reference receiver is a fixed station or external sensors, like sensors integrated in a car, might be able to provide the information on the state of motion.

It is to be understood that the message assembly component 151 may receive in addition further information from GNSS receiver 160, like timestamps and continuity indications for the carrier-phase measurements or position information.

The message assembly component 151 now determines an indication representing the current motion of GNSS reference receiver 160 and assembles a message including this indication together with the current carrier-phase measurements. The message is transmitted via transceiver 154 to user device 110. Corresponding messages are assembled and provided for transmission for a sequence of measurement instants (step 251).

The message is received by the user device 110 via transceiver 114. The indication of the motion of GNSS reference receiver 160 is provided to the change of baseline determination component 111. The carrier-phase measurements are provided to the positioning component 113.

The change of baseline determination component 111 receives the indication of the motion of GNSS reference receiver 160 and in addition acceleration information from accelerometer 122. It determines the current motion of GNSS rover receiver 120 based on this acceleration information (step 211). Based on the current motion of both GNSS receivers 120, 160, it further determines whether the baseline 180 changes and the acceleration of the baseline 180 (step 212). An indication of the presence of a change and of the obtained acceleration is forwarded to the filter adjustment component 112.

The filter adjustment component 112 receives the change indications. In addition, the filter adjustment component 112 is informed by the positioning component 113 after each processing cycle whether the float ambiguities have already been solved or not. At the beginning of the session, it is indicated that the float ambiguities have not yet been solved.

In case the float ambiguities have not yet been solved (step 213) and a current change of the baseline has been determined (step 214), the filter adjustment component 112 adjusts an extended Kalman filter to have a state space $x_{AMBIGUITY}$ comprising a baseline vector $\underline{b}$, a baseline rate-of-change vector $\underline{\dot{b}}$, which represents the first derivate of the float baseline, and a float ambiguities vector $\underline{a_{float}}$ (step 215):

$$x_{AMBIGUITY} = \begin{bmatrix} \underline{b} \\ \underline{\dot{b}} \\ \underline{a_{float}} \end{bmatrix} \quad (3)$$

It is to be understood that the adjustment may consist in selecting one of different available extended Kalman filters.

Moreover, the filter adjustment component 112 adjusts a process noise of the extended Kalman filter to be the larger, the higher the determined acceleration of the baseline. Without going into details, the update phase of the extended Kalman filter includes perturbing the state vector error covariance in time. This is the step where the process noise is taken into account. The error covariance prediction step is described by $$P_{k+1} = \left(\frac{\partial f}{\partial x}\bigg|_{x=x_k}\right) P_k \left(\frac{\partial f}{\partial x}\bigg|_{x=x_k}\right)^T + Q_k, \quad (4)$$

where $P_k$ and $P_{k+1}$ are the error covariances at the instants k and (k+1), respectively. $Q_k$ is the process noise at the instant k. The amount of process noise to be added is deduced from the acceleration information supplied by the change of baseline determination component 111. The actual implementation of the conversion of the acceleration information to process noise is discretionary and can be selected from many alternatives.

It has to be noted that in some cases it may also be useful to add a component for the baseline acceleration $\ddot{b}$ to the state vector of equation (3) or to define an additional selectable state vector including such a component. In this case, the process noise could also be set to a fixed low value. The process noise may then account for the rate-of-change of the acceleration. It may also be useful for numerical stability in the computations, for example for avoiding divisions by zero.

In case the float ambiguities have not yet been solved (step 213) and there is currently no change of the baseline (step 214), the filter adjustment component 112 adjusts an extended Kalman filter to have a state space $x_{AMBIGUITY}$ comprising a baseline vector $\underline{b}$ and a float ambiguities vector $\underline{a}_{float}$, but no baseline rate-of-change vector (step 216):

$$\underline{x}_{AMBIGUITY} = \begin{bmatrix} \underline{b} \\ \underline{a}_{float} \end{bmatrix} \quad (5)$$

It is to be understood that the adjustment may consist in selecting one of different available extended Kalman filters.

Moreover, the filter adjustment component 112 sets the processing noise of the extended Kalman filter to a predetermined low value.

In case the float ambiguities have already been solved in a later processing cycle (step 213) and there is currently a change of the baseline (step 217), the filter adjustment component 112 adjusts the extended Kalman filter to have a state space $x_{TRACK}$ comprising a baseline vector $\underline{b}$ and a baseline rate of change vector $\underline{\dot{b}}$, which represents the first derivate of the fixed baseline (step 218):

$$\underline{x}_{TRACK} = \begin{bmatrix} \underline{b} \\ \underline{\dot{b}} \end{bmatrix} \quad (6)$$

It is to be understood that the adjustment may consist of selecting one of different available extended Kalman filters.

Moreover, the filter adjustment component 112 adjusts a processing noise of the extended Kalman filter to be the larger, the higher the determined acceleration of the baseline.

Similar as for equation (3), it has to be noted that in some cases it may be useful to model also the baseline acceleration as a state in the state vector of equation (6).

In case the float ambiguities have already been solved in a later processing cycle (step 213) and there is currently no change of the baseline (step 217), the filter adjustment component 112 adjusts the extended Kalman filter to have a state space $x_{TRACK}$ comprising only a baseline vector $\underline{b}$ (step 219):

$$\underline{x}_{TRACK} = [\underline{b}] \quad (7)$$

It is to be understood that the adjustment may consist in selecting one of different available extended Kalman filters.

Moreover, the filter adjustment component 112 sets the processing noise to a predetermined low value.

The adjusted extended Kalman filter is provided to the positioning component 113, which applies the filter to carrier-phase measurements received from user device 150 and to carrier-phase measurements received for the same measurement instant from measurement component 121, and more specifically to double difference observables obtained from these measurements (step 220). The positioning component 113 further informs the filter adjustment component 112, whether or not the float ambiguities have been solved.

The process then continues with step 211 for the next measurement instant.

It is to be understood that also after it has been determined in step 213 that the ambiguities have been successfully resolved and validated, the initialization filter may continue running in the background in accordance with steps 214 to 215. The resulting information can be used for quality checking, etc.

Once the double difference float ambiguities have been resolved in the filtering using equation (3) or (4) and the baseline has been determined, the baseline may be tracked in a filtering using equation (5) or (6). The result of the relative positioning may then be used for instance for a corresponding presentation to a user via a user interface.

Figure 3:
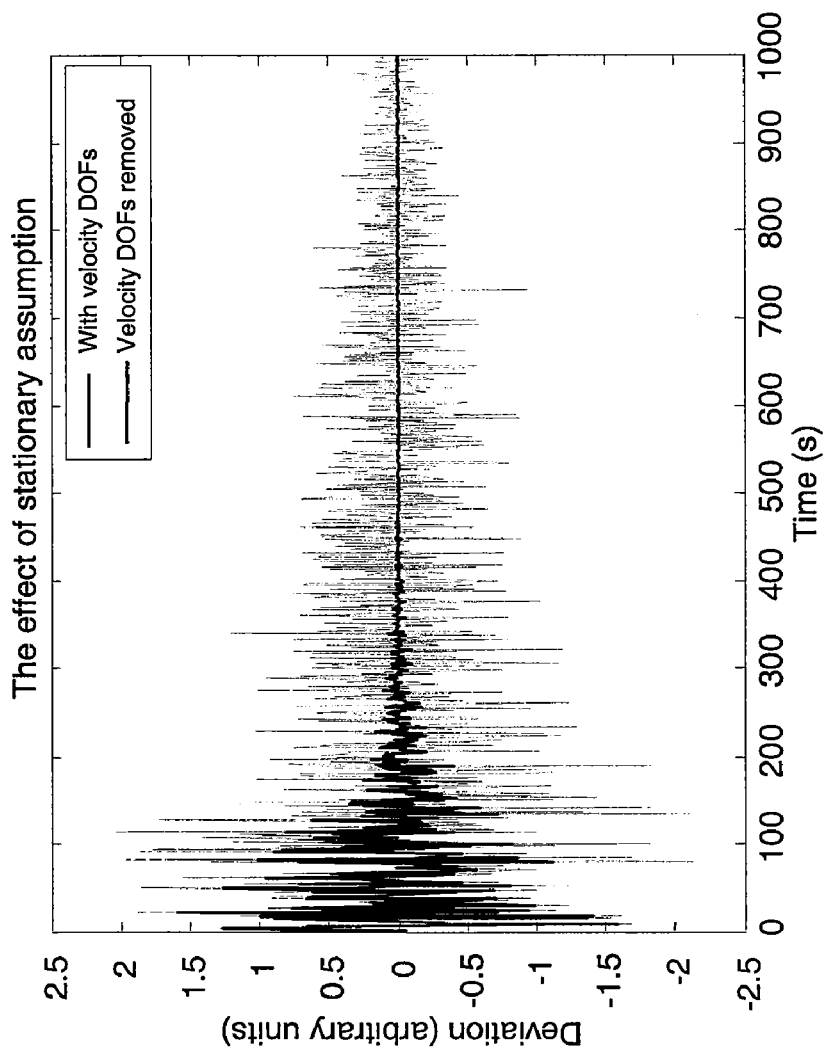
FIG. 3 is a diagram illustrating the effect of the assumption of a stationary baseline in the case of a stationary baseline.

The effect of minimizing the filter state space, that is of omitting a vector for the baseline rate-of change when not required, is illustrated in FIG. 3. FIG. 3 presents the deviation of the determined baseline from the true baseline in arbitrary units over time in second. The baseline is constant.

The thin, dotted line represents a case in which the absence of any change in the baseline is not considered.

In practice, this means that the baseline rate-of-change vector, which represents the velocity degree-of-freedoms (DOFs), is included in the state space. The result is that the filter constantly converges to the correct value, but the convergence is slow due to the need to resolve the baseline rate-of-change components in addition to the actual baseline components.

The thick, solid line, on the other hand, represents a case in which the state space of the filter is selected based on the information that the baseline is truly constant. That is, the baseline rate-of-change vector is removed from the state space. The result is fast convergence to the correct value of zero (i.e. no error).

It should be acknowledged that the carrier phase measurements are able to provide an accurate velocity solution using a state space which includes the velocity DOFs as well, if the filtering time is long enough. However, the performance can be improved, if external sources are used to provide stationary information, since in this case, there is no need for lengthy filtering.

Figure 4:
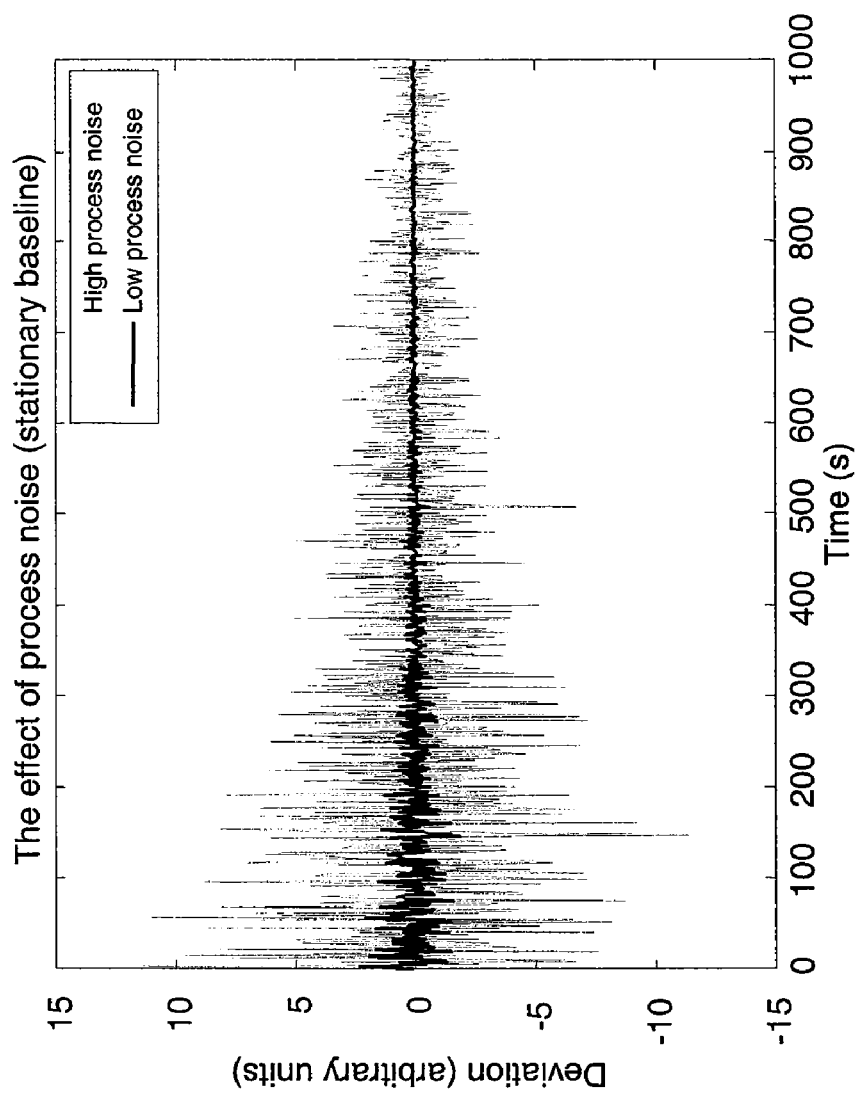
FIG. 4 is a diagram illustrating the effect of high and low process noise assumptions in the case of a stationary baseline.

The effect of high and low process noise assumptions in the case of a constant baseline is illustrated in the diagram of FIG. 4. FIG. 4 presents again the deviation of the determined baseline from the true baseline in arbitrary units over time in second. The velocity DOFs are taken into account, although the baseline is truly stationary.

The thin, dotted line represents a case in which the filter is set to include a high process noise. The thick, solid line, on the other hand, represents a case in which the filter is set to include a low process noise.

As can be seen, the lower process noise results in less noise in the baseline solution and in faster convergence. Hence, setting the process noise to as low a value as possible is desirable. However, if the process noise is low while there is actually acceleration in the baseline, the filter may diverge or work non-optimally. Thus, using always a predetermined low process noise is not feasible.

The presented embodiment uses therefore a low process noise in case of no acceleration in the baseline and a higher process noise in case of acceleration of the baseline. The presented embodiment uses in addition an adjustable higher process noise in the case acceleration is present.

Figure 5:
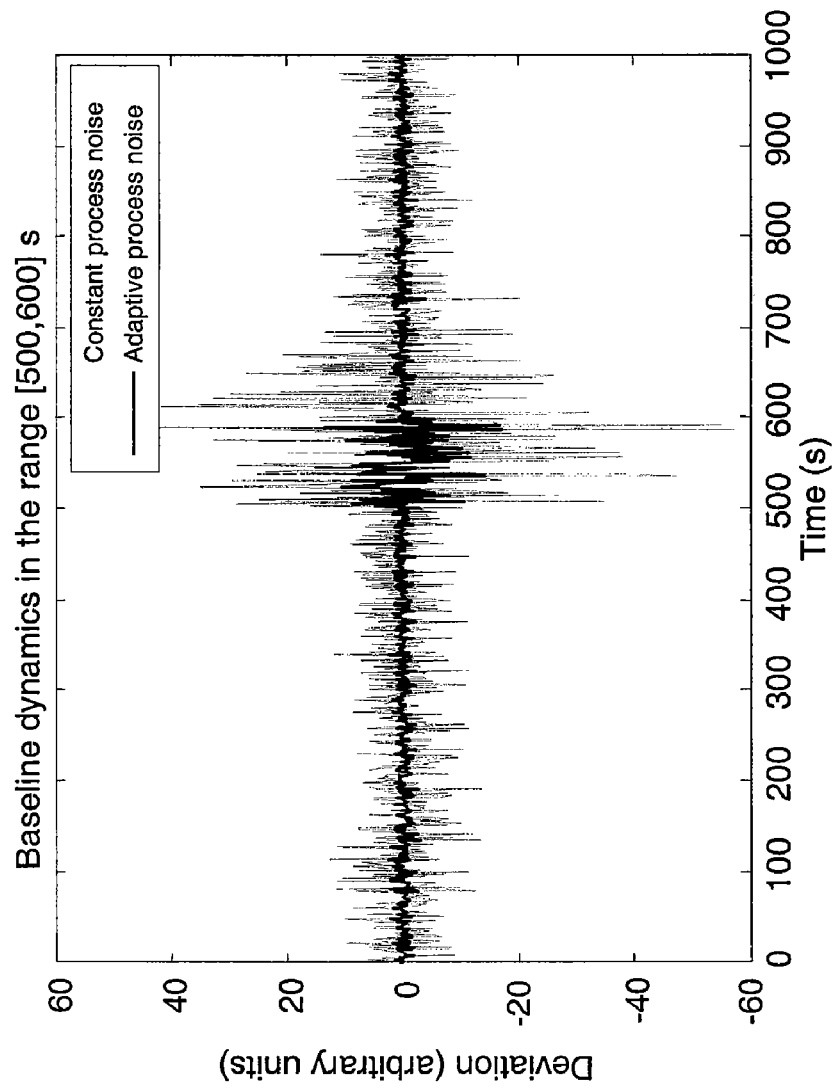
FIG. 5 is a diagram illustrating the effect of constant and adaptive process noise assumptions in the case of a baseline changing with acceleration.

The effect of constant and adaptive process noise assumptions in the case of acceleration of the baseline is illustrated in the diagram of FIG. 5. FIG. 5 presents again the deviation of the determined baseline from the true baseline in arbitrary units over time. The baseline does not comprise any acceleration most of the time between second 0 and second 1000, but comprises acceleration in a period between second 500 and second 600.

A thin, dotted line represents a situation in which the filter uses a high constant process noise. If the process noise is chosen to be constant, the noise must be set to relatively high level because of the possible acceleration, as mentioned above. A thick, solid line represents a situation in which the filter uses adaptive process noise instead. When the accelerometers supply information that there is no acceleration in the system, for example between second 0 and second 500, the process noise may be set to low level. This results in a similar advantage as described with reference to FIG. 4 for a constant baseline.

The benefit becomes even more profound when there are dynamics in the system, as in the period from second 500 to second 600, when the baseline has acceleration.

The thin, dotted line shows the problems resulting with constant process noise in the case of acceleration of the baseline. First of all, if the process noise is not at the optimal high level, the disturbance in the baseline solution is significant. Also, after the acceleration has ended at second 600, the perturbation remains for some time. It takes a significant amount of time for the filter to stabilize after the acceleration of the baseline, because the process noise was correct neither during nor after the acceleration. In the worst case, the filter may start to oscillate and diverge completely.

The thick, solid line, in contrast, shows the benefits obtained with an adaptive process noise in the case of acceleration of the baseline. The sensors supply information about the magnitude of the acceleration, and a suitable process noise is deduced from this magnitude. As a result, there is only minor disturbance in the baseline solution in the case of acceleration of the baseline. This disturbance cannot be eliminated completely, since the acceleration is not modeled but fed to the system as noise.

In the example of FIG. 5, the magnitude of the baseline acceleration has been used to control the process noise. It is to be understood, however, that it would also be possible to adaptively control the process noise for the x, y and z coordinates individually, if the employed sensor can provide suitable input for the filter.

Figure 6:
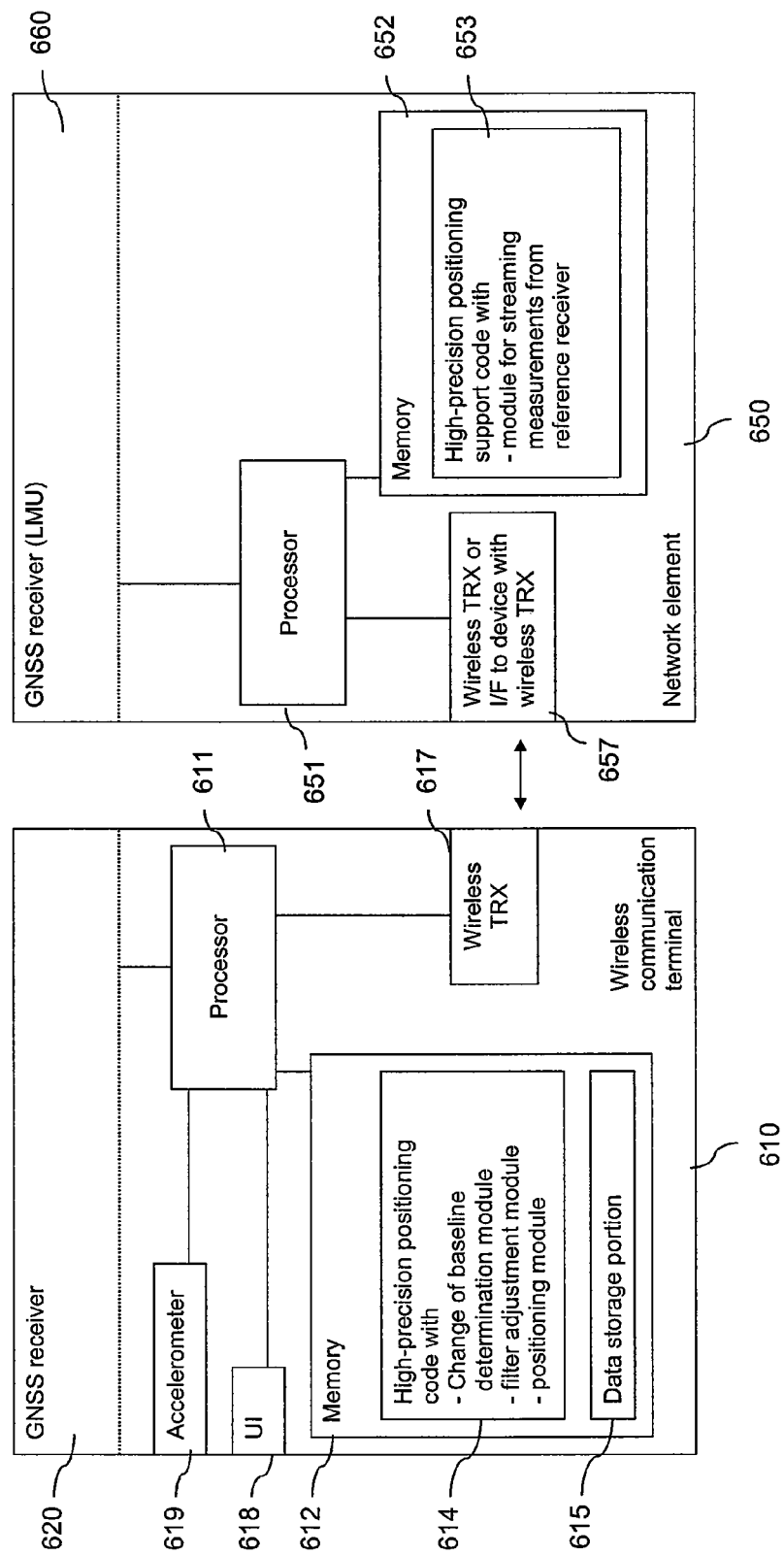
FIG. 6 is a schematic block diagram of a system according to a second embodiment of the invention.

FIG. 6 is a schematic block diagram of a system, which enables an adaptive filtering for determining and tracking a baseline between two GNSS receivers in accordance with a second embodiment of the invention.

The system comprises a wireless communication terminal 610 and a network element 650.

The terminal 610 can be for instance a mobile phone.

The terminal 610 comprises a processor 611 and, linked to this processor 611, a memory 612, a transceiver (TRX) 617, a user interface 618, an accelerometer 619 and a GNSS receiver 620. It is to be understood that the GNSS receiver 620 could also be a separate device. In case the GNSS receiver 620 can be moved separately from the terminal 610, however, the accelerometer 619 has to be integrated in or physically connected to the GNSS receiver 620. GNSS receiver 620 functions as a rover receiver.

The processor 611 is configured to execute implemented computer program code. The memory 612 stores computer program code, which may be retrieved by the processor 611 for execution. The stored computer program codes comprise a high-precision positioning program code 614, which includes functional modules for detecting a change of a baseline based on sensor information, for adjusting an extended Kalman filter and for performing a relative positioning based on double-difference observables using such an extended Kalman filter. The memory 612 may further provide a data storage portion 615.

It is to be understood that the functions of the processor 611 could also be implemented in hardware in the terminal 610, for example in the form of an integrated circuit chip. Further, it is to be understood that functions realized by the processor 611 could also be realized for example by the GNSS receiver 620.

The transceiver 617 of the wireless communication terminal 610 is configured to enable a wireless communication with some other device using a cellular link or a non-cellular link, like a wireless LAN connection. The employed communication channel may also be a control plane channel or a secure user plane location (SUPL) channel.

The network element 650 can be for instance a base station of a cellular communication network or of a WLAN, or a network server linked to such a base station, like an SMLC.

The network element 650 comprises a processor 651 and, linked to this processor 651, a memory 652 and an interface 657. The processor 651 is further linked to a GNSS receiver 660 which is internal or external to the network element 650, for example the GNSS receiver 660 of an external LMU. GNSS receiver 660 functions as a reference receiver.

The processor 651 is configured to execute implemented computer program code. The memory 652 stores computer program code, which may be retrieved by the processor 651 for execution. The stored computer program codes comprise a high-precision positioning support program code 653 including functional modules for streaming measurements from GNSS receiver 660 to a wireless communication terminal.

It is to be understood that the functions of processor 651 could also be implemented in hardware in network element 650, for example in the form of an integrated circuit chip.

The interface 657 is configured to enable a direct or indirect communication with terminal 610. If the network element 650 is a base station of a wireless communication network, for example, the interface 657 could be a transceiver, which enables the wireless communication terminal 610 to access the wireless communication network. If the network element 650 is a network server, the interface may be an interface to other network elements, which connect the network element 650 to a base station of a wireless communication network that may be accessed by the wireless communication terminal 610.

The GNSS receivers 620, 660 are both configured to operate as normal GNSS receivers. That is, they are configured to receive, acquire, track and decode signals transmitted by satellites belonging to one or more GNSSs, like GPS and Galileo. Further, they are configured to compute a stand-alone position in a known manner based on the received satellite signals. It is to be understood that such computations could also be realized in a processing component outside of the GNSS receivers 620, 660, for example in processor 611 or 651, respectively. It is to be understood that the conventional positioning of GNSS receiver 620 could moreover be supported by assistance data provided by GNSS receiver 660. In addition, the GNSS receivers 620, 660 are both configured to perform carrier-phase measurements on received satellite signals.

A user may input a request via user interface 618 to determine a relative or absolute position GNSS receiver 620, or more specifically of an antenna reference point of GNSS receiver 620, with a high precision.

Figure 2:
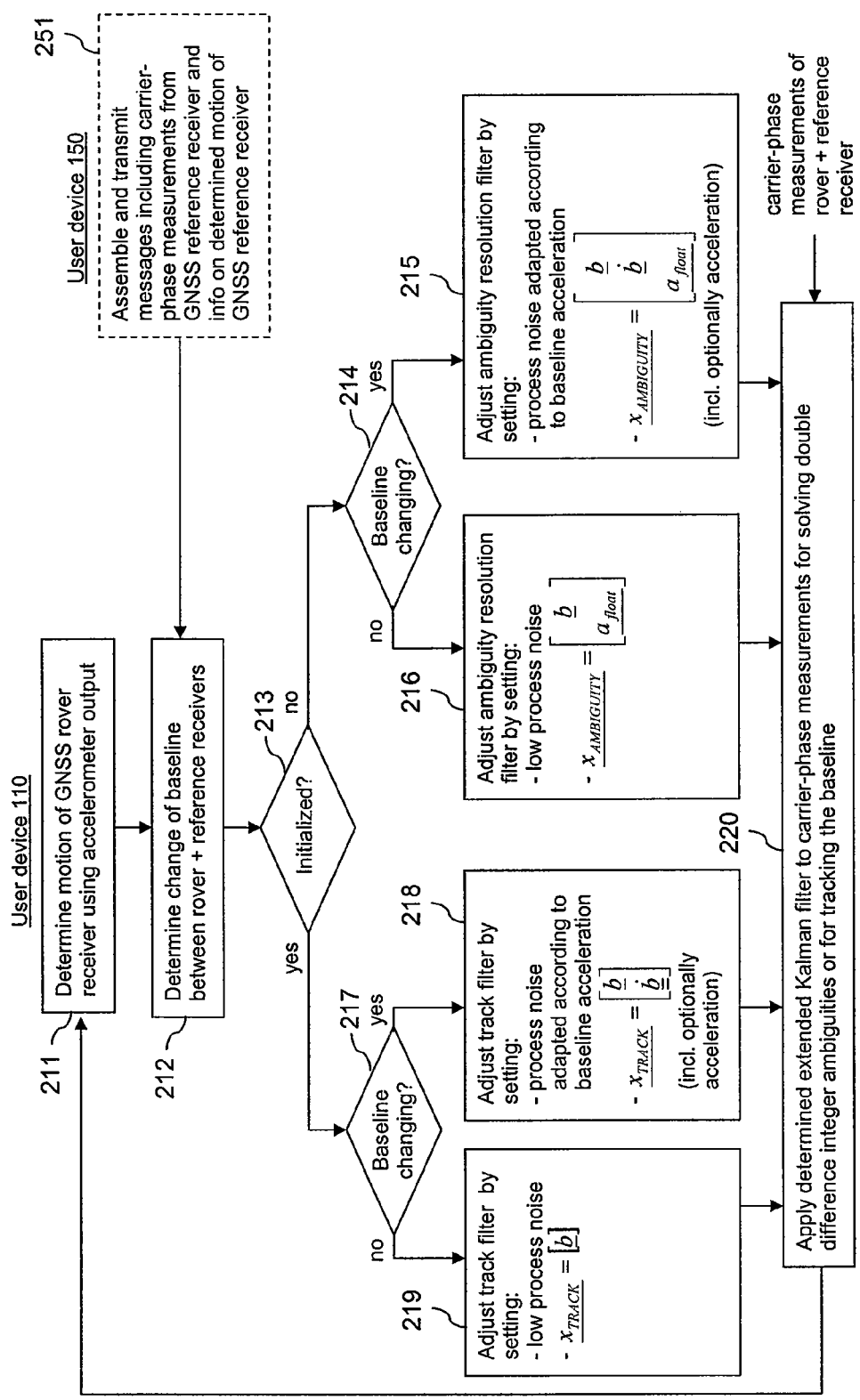
FIG. 2 is a flow chart illustrating an exemplary operation in the system of FIG. 1.

Using computer program code 614, the processor 611 may thereupon send an assistance request to the network element 650 and carry out steps 211-220 described with reference to FIG. 2.

The processor 651 of network element 650 in turn may use computer program code 614 for carrying out step 251 described with reference to FIG. 2. In this case, however, the processor 651 does not have to determine motion of the GNSS receiver 620, since the reference receiver is fixed. It may either provide a predefined stationary indication in the assembled messages, or the terminal 610 may know that the network end of the baseline is fixed when requesting carrier-phase measurements from the network.

It has to be noted that while the carrier-phase measurements included by processor 651 in the assembled messages could be the measurements provided by the GNSS receiver 660 for the location of the GNSS receiver 660, the processor 651 could also convert the received measurements based on additionally provided navigation data to measurements for a virtual reference station (VRS) located at any desired location. If the terminal 610 provides in the assistance request a rough position estimate calculated using standard GNSS positioning calculations, using such a virtual reference station at a similar location is suited to minimize the length of the baseline that is to be determined and tracked. This improves the performance and reliability of carrier phase based positioning.

Since the location of the fixed GNSS receiver 660 or of a generated VRS is known, the processor 651 may include in addition an accurate position of the antenna reference point of GNSS receiver 660 or of a VRS in the assembled messages to enable the terminal 610 to determine an absolute position with high-precision.

In this case, the processor 611 may simply add the baseline determined in step 220 to the indicated accurate position of the antenna reference point of GNSS receiver 660 or of a VRS to obtain the absolute position of the antenna reference point of GNSS receiver 620.

The user interface 618 may enable the processor 611 to present the result of the relative or absolute positioning to a user.

Instead of performing the positioning calculations immediately, processor 611 could also store carrier-phase measurements from GNSS receiver 620 and GNSS receiver 660 as well as motion information from network element 650 and accelerometer 619 for the identical sequence of time instants in the data storage portion 615 of the memory 612 for later evaluation.

The functions illustrated by components 111 to 112 or by the processor 611 executing program code 614 can also be viewed as means for adjusting a filter depending on sensor information on a movement of a satellite signal receiver, while the functions illustrated by component 113 or by the processor 611 executing program code 614 can also be viewed as means for determining a position of the satellite signal receiver relative to a reference station using the filter, wherein measurements on satellite signals received by the satellite signal receiver and measurements on satellite signals provided for the reference station are used as input to the filter. Alternatively, the functions illustrated by the functional modules of the program code 614 can be viewed as such means.

Further, the functions illustrated by component 151 or by the processor 651 executing program code 653 can also be viewed as means for assembling messages including measurements on satellite signals that are valid for a reference station and including an indication of a current movement of the reference station and as means for providing the assembled messages for transmission to a device. Alternatively, the functions illustrated by the functional modules of the program code 653 can be viewed as such means.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures.

What is claimed is:

1. A method comprising:
   assembling, by an apparatus, messages including measurements on satellite signals that are valid for a reference station and explicitly including for a respective measurement instant for which measurements are included an indication of a current movement of the reference station, said indication being determined independently of measurements on satellite signals; and
   providing, by the apparatus, the assembled message for transmission to a device.

2. The method according to claim 1, wherein the reference station is mobile and wherein the indication of a current movement of the reference station is determined based on at least one of:
   sensor information; and
   information provided by an accelerometer.

3. An apparatus comprising at least one of a hardware circuit and a processor and a memory including computer program code, the hardware circuit configured to or the memory and the computer program code configured to, with the processor, cause the apparatus at least to perform
   assemble a message including measurements on satellite signals that are valid for a reference station and explicitly including for a respective measurement instant for which measurements are included an indication of a current movement of the reference station, said indication being determined independently of measurements on satellite signals; and provide the assembled message for transmission to a device.

4. The apparatus according to claim 3, wherein the reference station is located at a fixed position.

5. The apparatus according to claim 3, wherein the reference station is mobile and wherein the hardware circuit is configured to or the memory and the computer program code are configured to, with the processor, cause the apparatus to determine an indication of a current movement of the reference station based on at least one of:

sensor information; and information provided by an accelerometer.

6. The apparatus according to claim 3, further comprising at least one of:

an interface configured to enable a communication with another device;

a satellite signal receiver; and an accelerometer.

7. The apparatus according to claim 3, wherein the apparatus is one of:

a mobile terminal;

a mobile phone;

a laptop;

a network element;

a network server; and a module for a mobile terminal or for a network element.

8. The apparatus according to claim 3, wherein the indication of a current movement of the reference station comprises an adaptive indication of the degree of movement.

9. The apparatus according to claim 3, wherein measurements on satellite signals for a respective measurement instant and an indication of a current movement of the reference station are included in a single message.

10. A method comprising:

receiving, by an apparatus, assembled messages including measurements on satellite signals that are valid for a reference station and explicitly including for a respective measurement instant for which measurements are included an indication of a current movement of the reference station, said indication determined independently of measurements on satellite signals; and determining, by the apparatus, a position of a satellite signal receiver relative to the reference station using the measurements on satellite signals that are valid for the reference station and the indication of the current movement of the reference station.

11. The method according to claim 10, wherein determining the position of the satellite signal receiver relative to the reference station comprises:

adjusting a number of components of a state space of a filter depending on the indication of the current movement of the reference station and on information on a movement of the satellite signal receiver; and determining the position of the satellite signal receiver relative to the reference station using the filter, wherein measurements on satellite signals received by the satellite signal receiver and the received measurements on satellite signals that are valid for the reference station are used as an input to the filter.

12. The method according to claim 11, wherein the components of the state space of the filter are adjusted to comprise, depending on the indication of the current movement of the reference station and on information on a movement of the satellite signal receiver, one or more of:

a baseline component;

a baseline rate of change component;

a baseline acceleration component; and a float ambiguities component.

13. The method according to claim 10, wherein determining the position of the satellite signal receiver relative to the reference station comprises:

adjusting a filter depending on the indication of the current movement of the reference station and on information on a movement of the satellite signal receiver; and determining the position of the satellite signal receiver relative to the reference station using the filter, wherein the received measurements on satellite signals that are valid for a reference station are carrier-phase measurements, and wherein carrier-phase measurements on satellite signals received by the satellite signal receiver and the carrier-phase measurements on satellite signals that are valid for the reference station are used as input to the filter.

14. An apparatus comprising at least one of a hardware circuit and a processor and a memory including computer program code, the hardware circuit configured to or the memory and the computer program code configured to, with the processor, cause the apparatus at least to perform receive assembled messages including measurements on satellite signals that are valid for a reference station and explicitly including for a respective measurement instant for which measurements are included an indication of a current movement of the reference station, said indication determined independently of measurements on satellite signals; and determine a position of a satellite signal receiver relative to the reference station using the measurements on satellite signals that are valid for the reference station and the indication of the current movement of the reference station.

15. The apparatus according to claim 14, wherein the hardware circuit is configured to or the memory and the computer program code are configured to, with the processor, cause the apparatus to determine the position of the satellite signal receiver relative to the reference station by:

adjusting a number of components of a state space of a filter depending on the indication of the current movement of the reference station and on information on a movement of the satellite signal receiver; and determining the position of the satellite signal receiver relative to the reference station using the filter, wherein measurements on satellite signals received by the satellite signal receiver and the measurements on satellite signals provided for the reference station are used as an input to the filter.

16. The apparatus according to claim 15, wherein the hardware circuit configured to or the memory and the computer program code configured to, with the processor, cause the apparatus to adjust the components of the state space of the filter to comprise, depending on the indication of the current movement of the reference station and on information on a movement of the satellite signal receiver, one or more of:

a baseline component;

a baseline rate of change component;

a baseline acceleration component; and a float ambiguities component.

17. The apparatus according to claim 14, wherein the hardware circuit is configured to or the memory and the computer program code are configured to, with the processor, cause the apparatus to determine the position of the satellite signal receiver relative to the reference station by:

adjusting a filter depending on the indication of the current movement of the reference station and on information on a movement of the satellite signal receiver; and determining the position of the satellite signal receiver relative to the reference station using the filter, wherein the received measurements on satellite signals that are valid for a reference station are carrier-phase measurements, and wherein carrier-phase measurements on satellite signals received by the satellite signal receiver and the carrier-phase measurements on satellite signals that are valid for the reference station are used as input to the filter.

18. The apparatus according to claim 14, further comprising at least one of a wireless communication component configured to receive the assembled messages from another device; and the satellite signal receiver;

an accelerometer.

19. The apparatus according to claim 14, wherein the apparatus is one of:

a mobile terminal;

a mobile phone;

a laptop;

a satellite signal receiver; and a module for a mobile terminal or for a satellite signal receiver.

20. The apparatus according to claim 14, wherein the indication of a current movement of the reference station comprises an adaptive indication of the degree of movement.

* * * * *